(12) United States Patent
Ishizaka

(10) Patent No.: US 6,477,311 B2
(45) Date of Patent: Nov. 5, 2002

(54) METHOD AND DEVICE FOR SELECTING LIGHT SOURCE FOR OPTICAL COMMUNICATION

(75) Inventor: Masashige Ishizaka, Tokyo (JP)

(73) Assignee: NEC Corporation, Tokyo (JP)

( * ) Notice: Subject to any disclaimer, the term of this patent is extended or adjusted under 35 U.S.C. 154(b) by 2 days.

(21) Appl. No.: 09/837,371

(22) Filed: Apr. 19, 2001

(65) Prior Publication Data
US 2002/0034202 A1 Mar. 21, 2002

(30) Foreign Application Priority Data
Apr. 21, 2000 (JP) ........................................ 2000-121496

(51) Int. Cl.[7] ............................ G02B 6/00; H04B 10/00
(52) U.S. Cl. ........................................ 385/147; 359/109
(58) Field of Search ...................... 385/24, 147; 359/109

(56) References Cited

U.S. PATENT DOCUMENTS 5,604,827 A * 2/1997 Yamaguchi ..................... 385/1
5,936,992 A * 8/1999 Yamaguchi .................. 359/181

FOREIGN PATENT DOCUMENTS

JP 2661558 6/1997

\* cited by examiner

Primary Examiner—John D. Lee
Assistant Examiner—Scott A Knauss
(74) Attorney, Agent, or Firm—Foley & Lardner

(57) ABSTRACT

A method for selecting a light source for optical communication system comprises the steps of: measuring time division chirping characteristics and optical response waveforms of the light source responding to a fixed strength random pulse signal; performing a simulation of a transmission process based on measured data; computing a selection parameter as an index for determining a dispersion tolerance quality of the light source according to a computed post-transmission waveform of an optical signal that propagated through an optical fiber path; and deciding the dispersion tolerance quality of the light source based on values of the selection parameter. There is no need for providing the usual facilities required for dispersion tolerance evaluation such as EDFA, optical fibers, wavelength filter, receiving disk and error rate detector and the like and the time required for selection is significantly reduced.

6 Claims, 9 Drawing Sheets

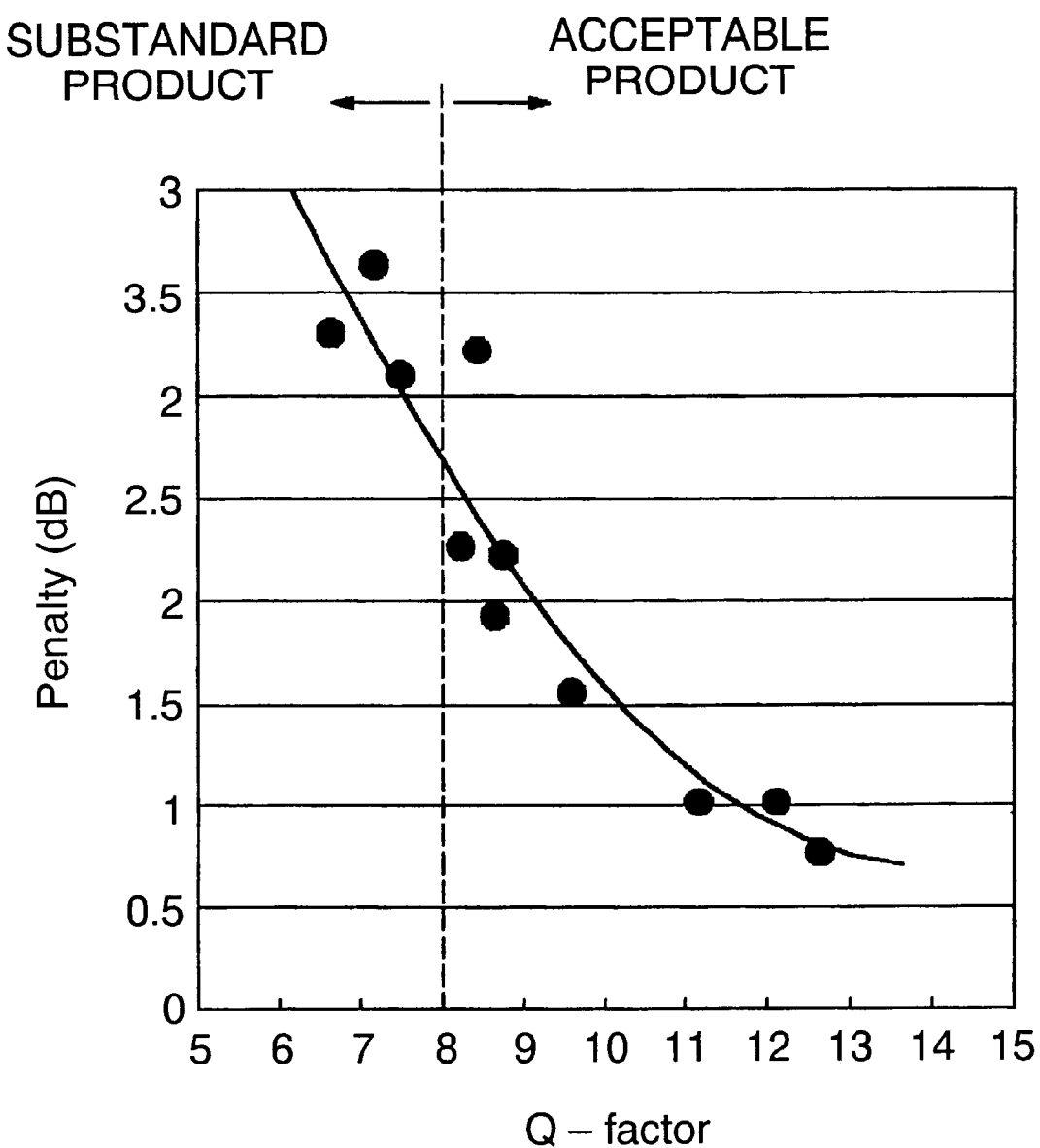

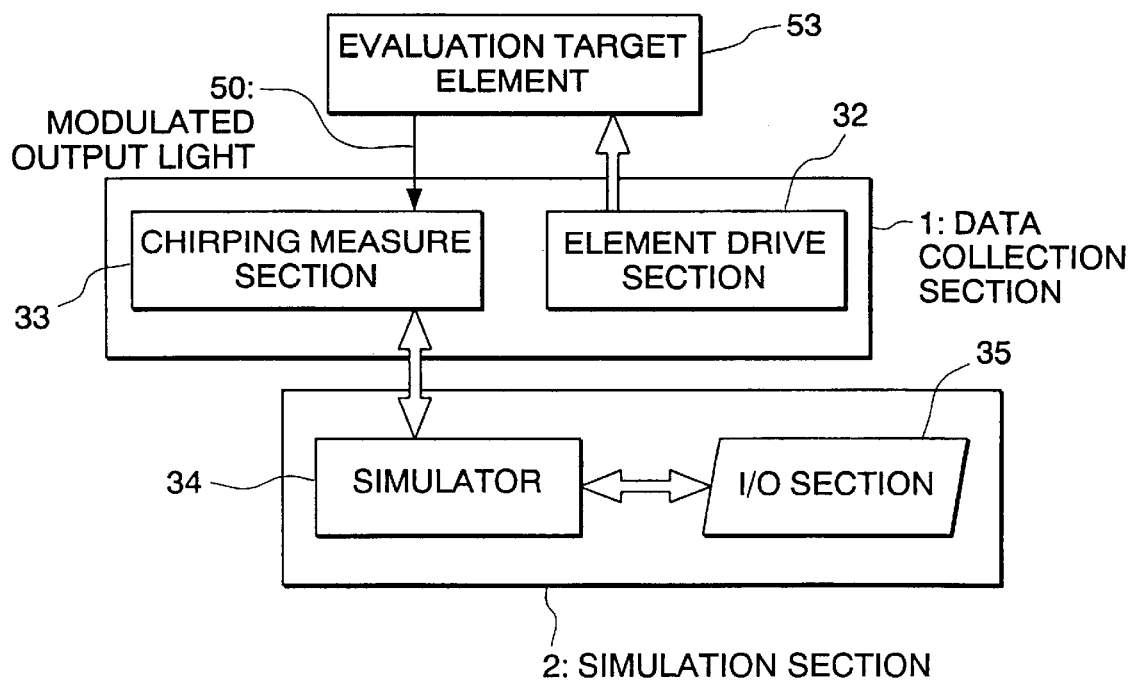
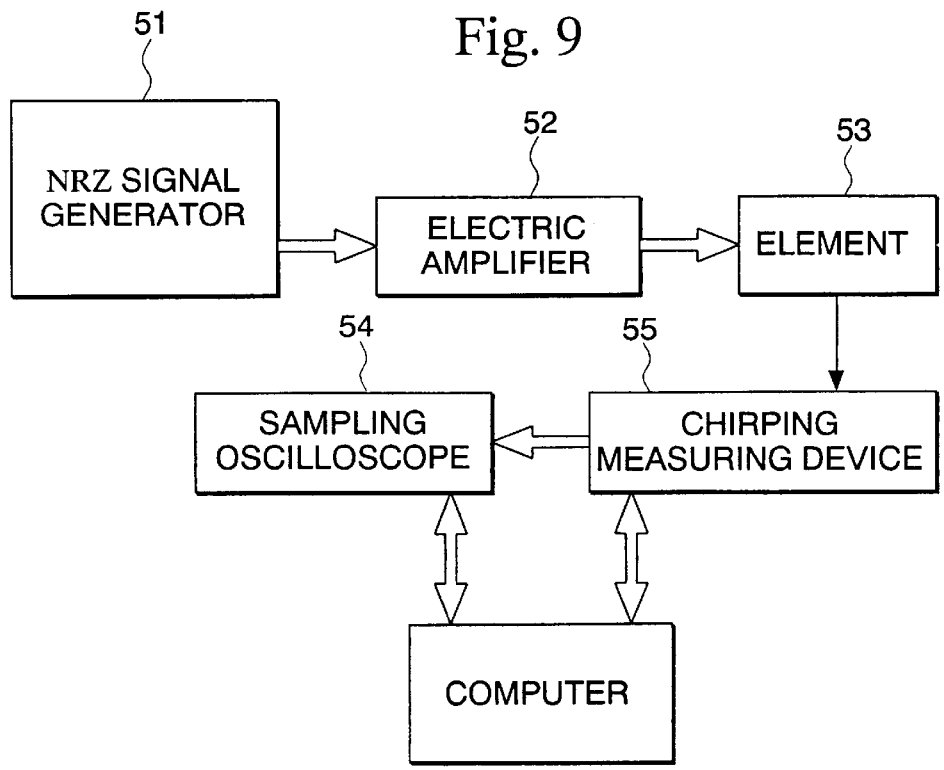

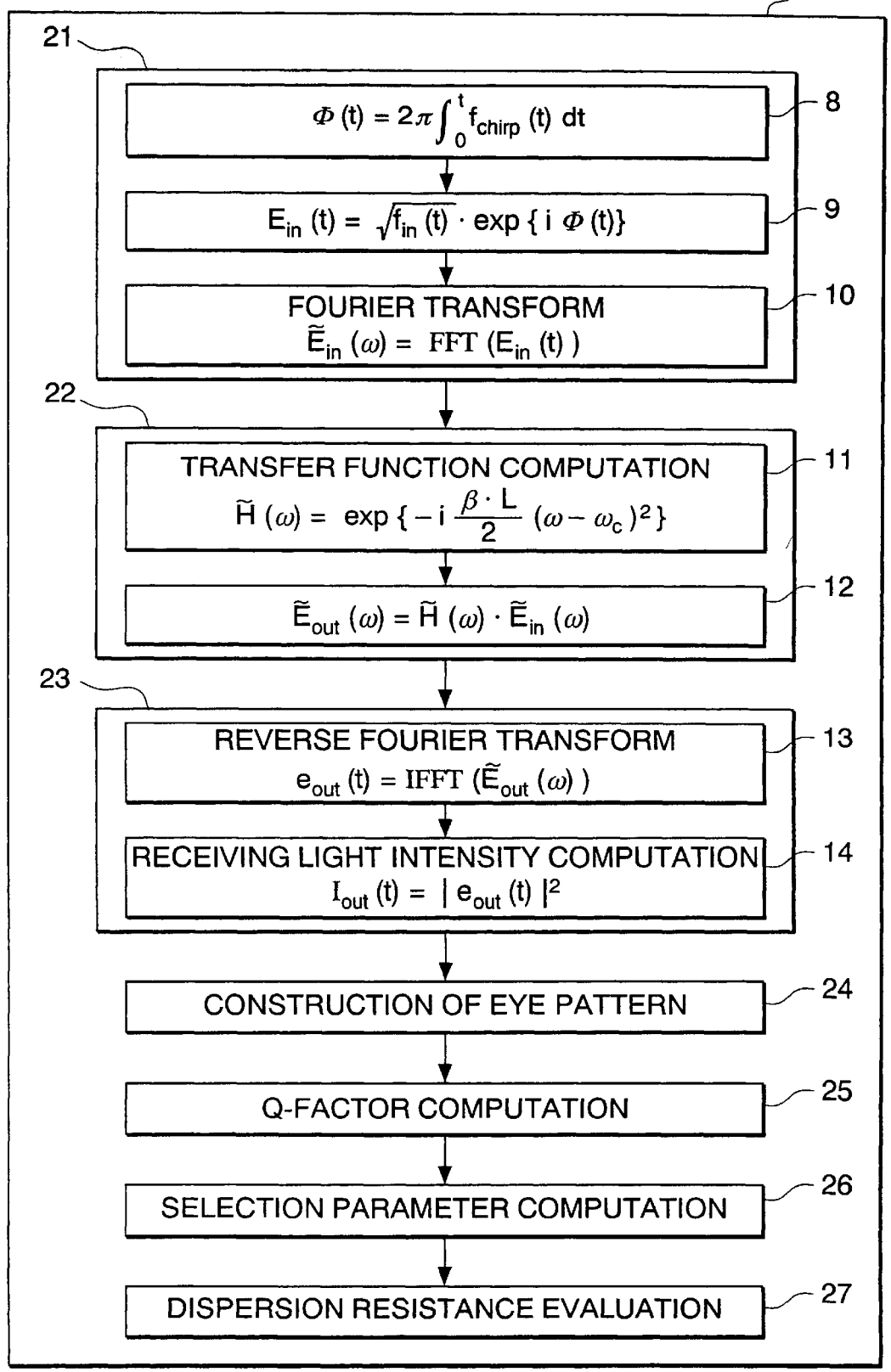

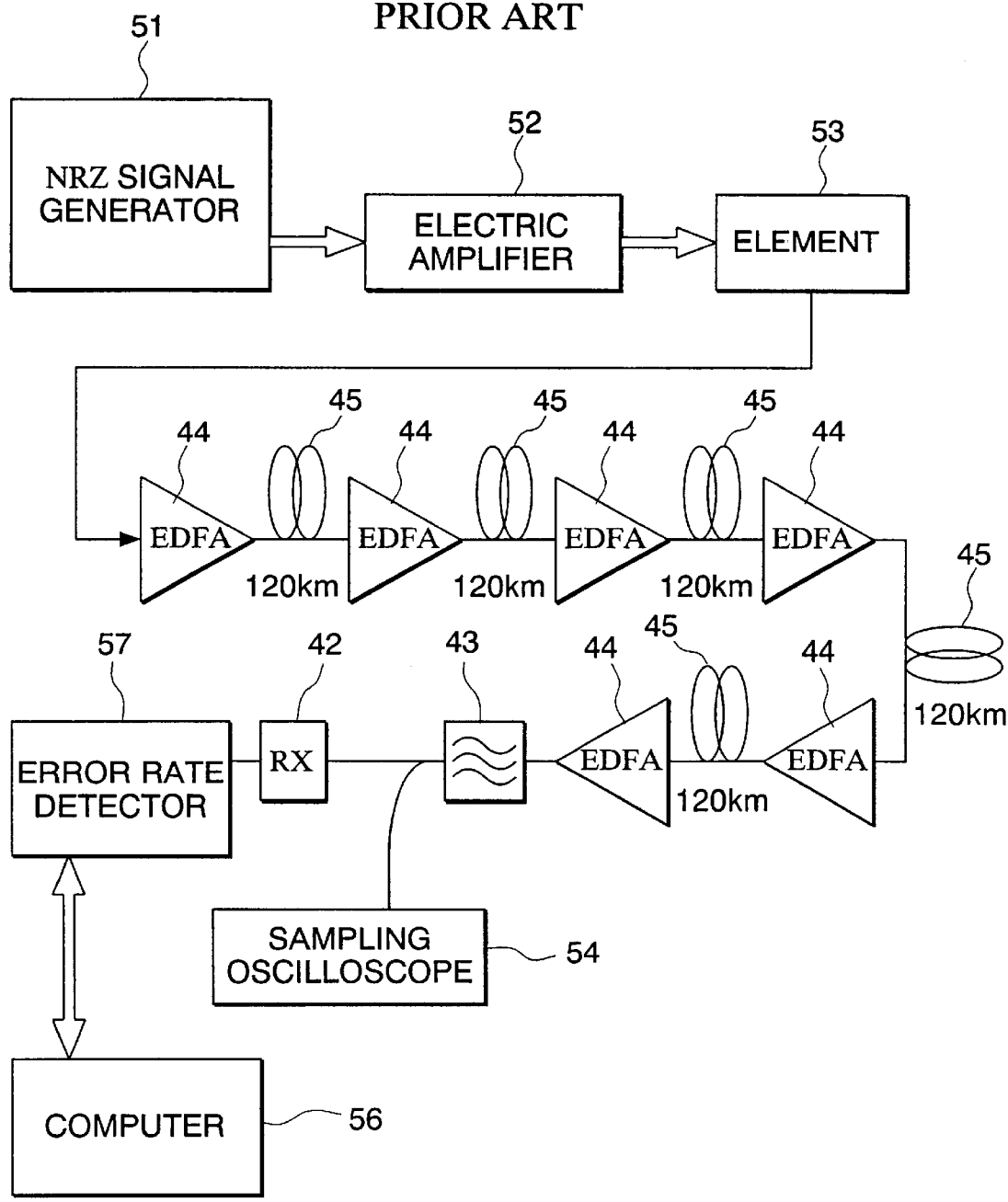

METHOD AND DEVICE FOR SELECTING LIGHT SOURCE FOR OPTICAL COMMUNICATION

BACKGROUND OF THE INVENTION

1. Field of the Invention

The present invention relates to a method for selecting a light source, such as semiconductor lasers and integrated light source for optical modulator, used in optical communication systems, and relates in particular to a selection method to determine dispersion tolerance quality of the light source.

2. Description of Related Art

One of indexes showing performance of semiconductor lasers used as a light source in optical communication systems is transmission capability, i.e., dispersion tolerance, and a light source having a superior dispersion tolerance is selected and used to operate a communication system. A conventional method for selecting a semiconductor laser having a superior dispersion tolerance utilizes a device shown in FIG. 10 to measure the post-transmission power penalty of an optical fiber path to determine its quality.

FIG. 10 is a schematic diagram of a conventional evaluation system used to select the dispersion tolerance quality. As shown in FIG. 10, a dispersion tolerance evaluation device is composed of: an NRZ (non-return-to-zero) signal generator 51 for supplying NRZ signals to a semiconductor laser (referred to as the element hereinafter) 53 to be evaluated through an electric amplifier 52; optical fiber 45; EDFAs (Erbium doped fiber amplifier) 44; a wavelength filter 43; a receiver disk 42; an error rate detector 57; a sampling oscilloscope 54 for post-transmission waveform observation; and a computer 56 for controlling the error rate detector.

NRZ-modulated light output from the element 53 propagates through the optical fiber 45 while receiving loss compensation by the EDFA 44, and after ASE noise is eliminated by the wavelength filter 43, arrives in the receiver disk 42. The error rate of signals detected by the receiver disk 42 is evaluated in the error rate detector 57, and a bit error rate curve is measured in real-time. Further, the bit-error rate of the optical signal just after emission from the element 53, that is, the bit-error rate of the optical signal before it propagates through the optical fiber 45 is separately measured in real-time. From the measured data of bit error rates before or after transmission, the power penalty is determined, and an element that produces results lower than a predetermined power penalty value is selected as an acceptable product. In FIG. 10, the arrangement shown for dispersion tolerance evaluation is for a 600 km transmission path, but in practice, the fiber length is varied according to the dispersion tolerance quality of the element.

However, according to the conventional method for evaluating the dispersion tolerance, actual transmission experiments must be carried out, thus it is necessary to provide incidental facilities such as optical fibers, EDFAs, wavelength filter, receiving disk (RX) and the like. Also, depending on the dispersion tolerance of an element to be required, the fiber length must be varied for each test. Furthermore, to measure the bit error rate (BER), it is necessary to devote about 15 minutes for each element. Therefore, the conventional method for evaluating the dispersion tolerance presents problems of excessive facility cost and lengthy selection process.

BRIEF SUMMARY OF THE INVENTION

It is an object of the present invention to eliminate the need for facilities such as EDFAs, optical fibers, wavelength filter, receiving disk, error rate detector, and the like for measuring the dispersion tolerance of a light source, and to significantly shorten the selection time required in evaluating the light source.

A first aspect of the present invention provides a method for selecting a light source for optical communication system comprising the steps of: measuring time division chirping characteristics and optical response waveforms of the light source responding to a fixed strength random pulse signal; performing a simulation of a transmission process based on measured data; computing a selection parameter as an index for determining a dispersion tolerance quality of the light source according to a computed post-transmission waveform of an optical signal that propagated through an optical fiber path; and deciding the dispersion tolerance quality of the light source based on values of the selection parameter.

A second aspect of the present invention provides a device for selecting a light source for optical communication system comprising: a measuring section for measuring time division chirping characteristics and optical response waveforms of the light source responding to a fixed strength random pulse signal; and a simulation section for computing a post-transmission waveform of an optical signal according to measured data, and computing a selection parameter as an index for determining a dispersion tolerance quality of the light source; and determining the dispersion tolerance quality of the light source by comparing the selection parameter with a predetermined selection criterion.

In the above aspects, the selection parameter is a value of an eye opening penalty $P_{eye}$ computed according to an equation:

$$P_{eye} = 10 \cdot \log(Q/Q_{B \cdot B})$$

(Notice: Q refers to a Q-factor computed from a post-transmission waveform of an optical signal resulting from a transmission simulation process, and $Q_{B \cdot B}$ refers to a Q-factor computed from a pre-transmission waveform of the optical signal.) or a Q-factor computed from a post-transmission waveform resulting by a transmission simulation process.

The present invention not only reduces the number of selection steps but is able to simulate the transmission process through the optical fiber itself so that it offers not only a freedom to choose transmission distance and dispersion characteristics through the fiber path but also an advantage that lesser incidental facilities such as optical fibers and EDFAs are needed for the selection process.

According to the above aspects, the present invention enables to replace actual experimentation of signal transmission through an optical fiber path with a simulation process, so that the present invention not only enables to freely select the transmission distance and dispersion characteristics of the fiber path, but also eliminates the necessity for items of experimental facility, such as EDFAs, optical fibers, wavelength filter, receiving device, error detector and the like. Also, a selection parameter for indexing the dispersion tolerance can be computed readily by simply changing the values of transmission distance (fiber length L) and the secondary group velocity dispersion β, according to the dispersion tolerance required, so that a dispersion tolerance quality required for an application can be easily and speedily determined. Furthermore, because a simulation process itself is completed in short time, the selection time can be significantly reduced compared with an actual experimental evaluation process.

BRIEF DESCRIPTION OF THE SEVERAL VIEWS OF THE DRAWING

FIG. 6 is a graph showing the relation between actual measurements of power penalty and Q-factors computed by simulation.

FIG. 7 is a block diagram of a selection device according to the present invention.

FIG. 8 is a block diagram of the simulator used in the selection device according to the present invention.

FIG. 9 is a block diagram of an embodiment of a selection device according to the present invention.

FIG. 10 is a block diagram of a conventional dispersion tolerance selection evaluation system.

DETAILED DESCRIPTION OF THE INVENTION

First Embodiment

Figure 1:
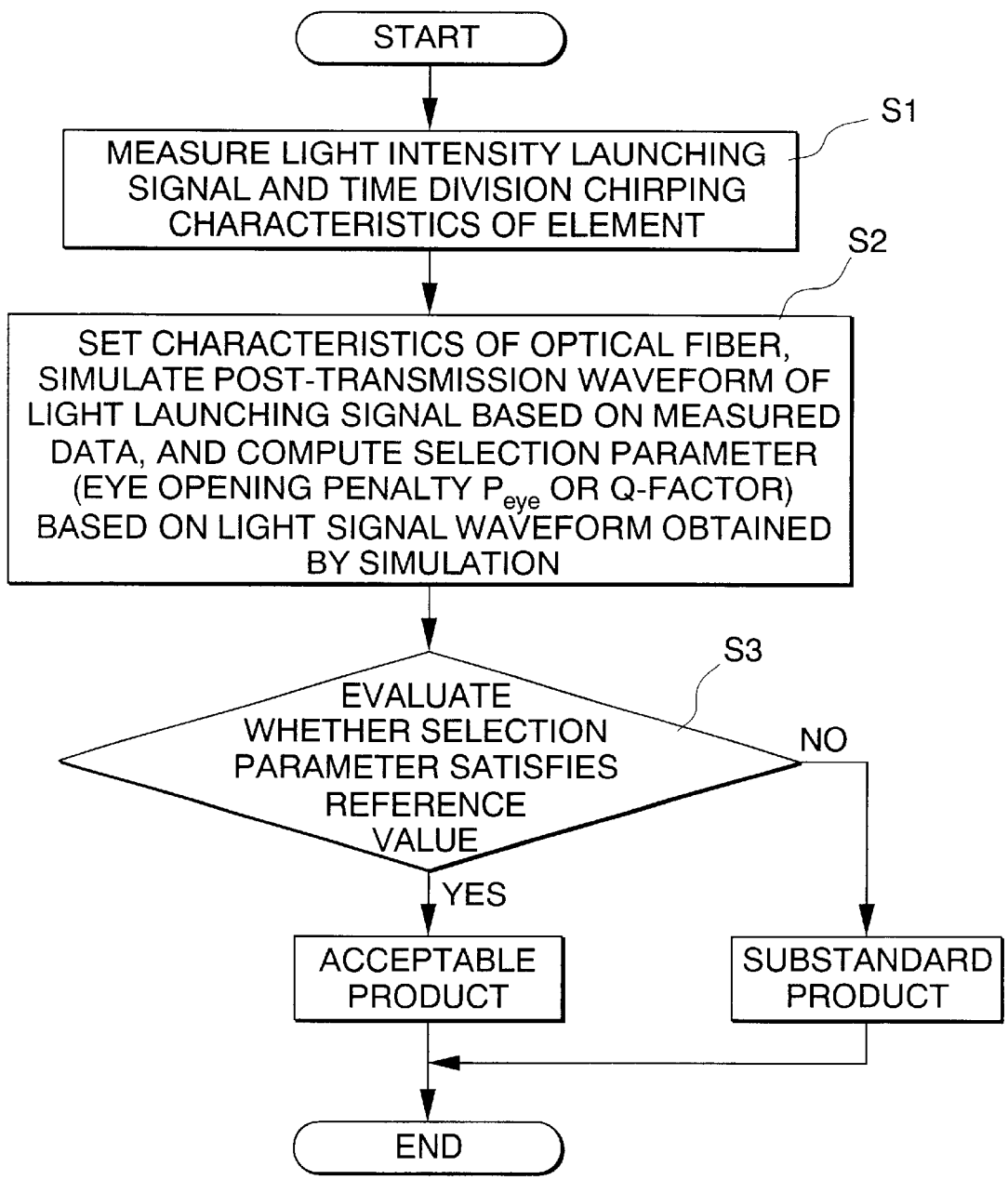
FIG. 1 is a flowchart for a selection process according to the present invention.
Figure 2:
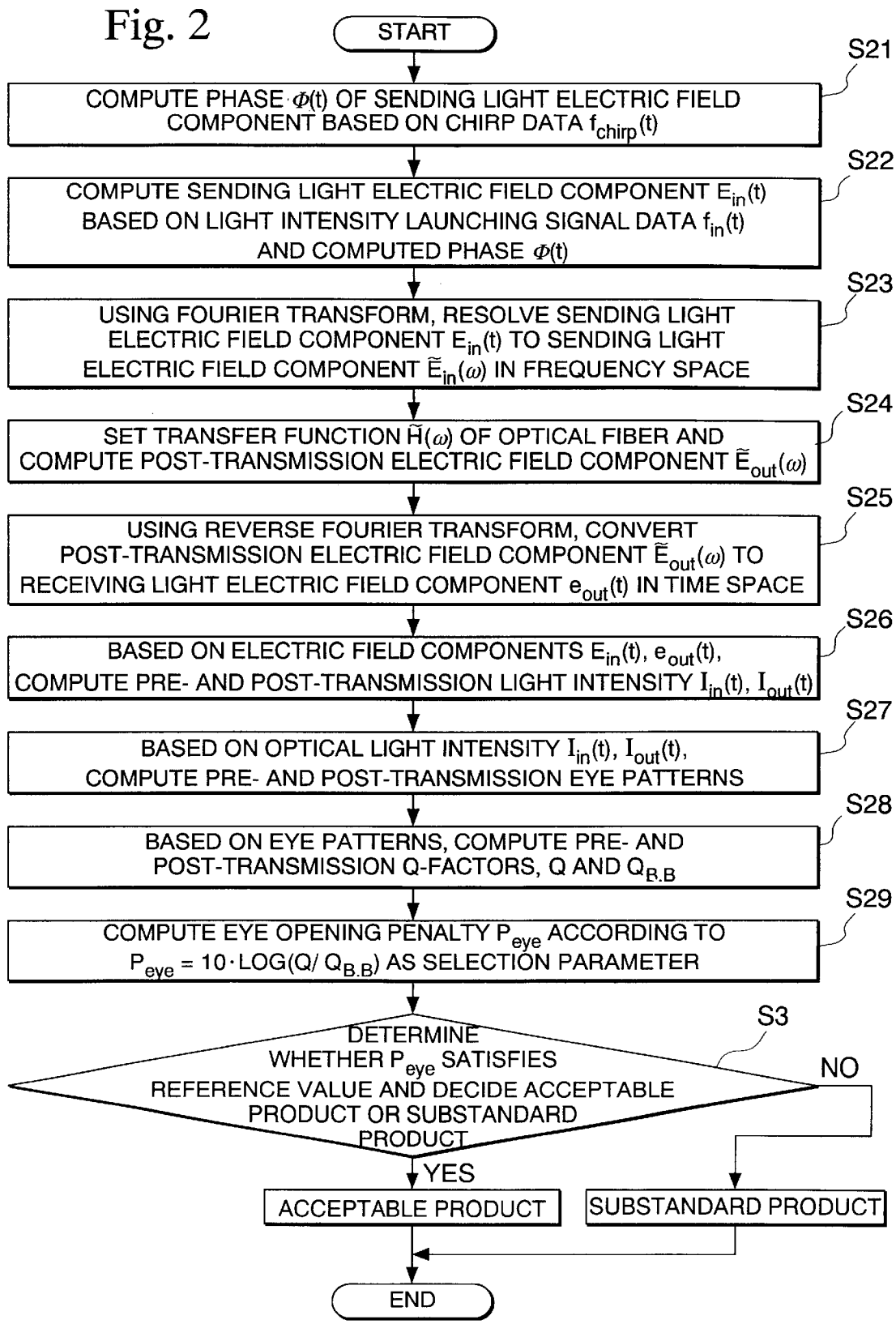
FIG. 2 is a flowchart for a simulation process in a first embodiment according to the present invention.

FIG. 1 shows a flowchart of a selection method of the present invention, and FIG. 2 is a flowchart of the computational steps carried out in step 2 shown in FIG. 1 for simulating the transmission process.

Figure 3:
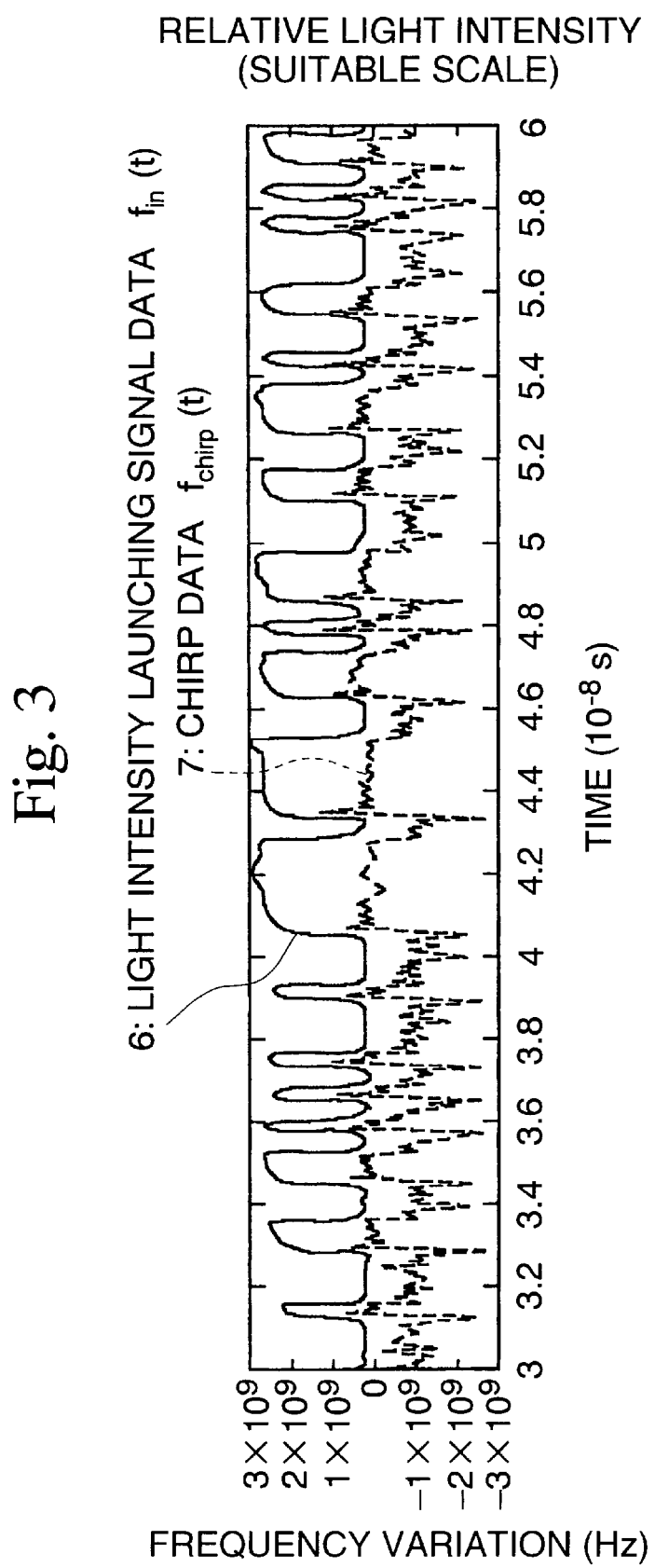
FIG. 3 is a graph of measured data used for selection method in the present invention.

FIG. 3 is a diagram of an example of actual measurements of time division chirp data and others, and represent optical response signal data when the element is modulated with fixed voltage random NRZ signals. The data are comprised by time-dependent light intensity data ($f_{in}$ (t)) of the launching signals, and frequency variation data of the carrier light, i.e., chirp data ($f_{chirp}$ (t)). Here, in the diagram, the horizontal axis relates to time (in seconds), and the left vertical axis relates to frequency variation (in Hz) while the right vertical axis relates to relative light intensity (suitable scale).

Figure 4:
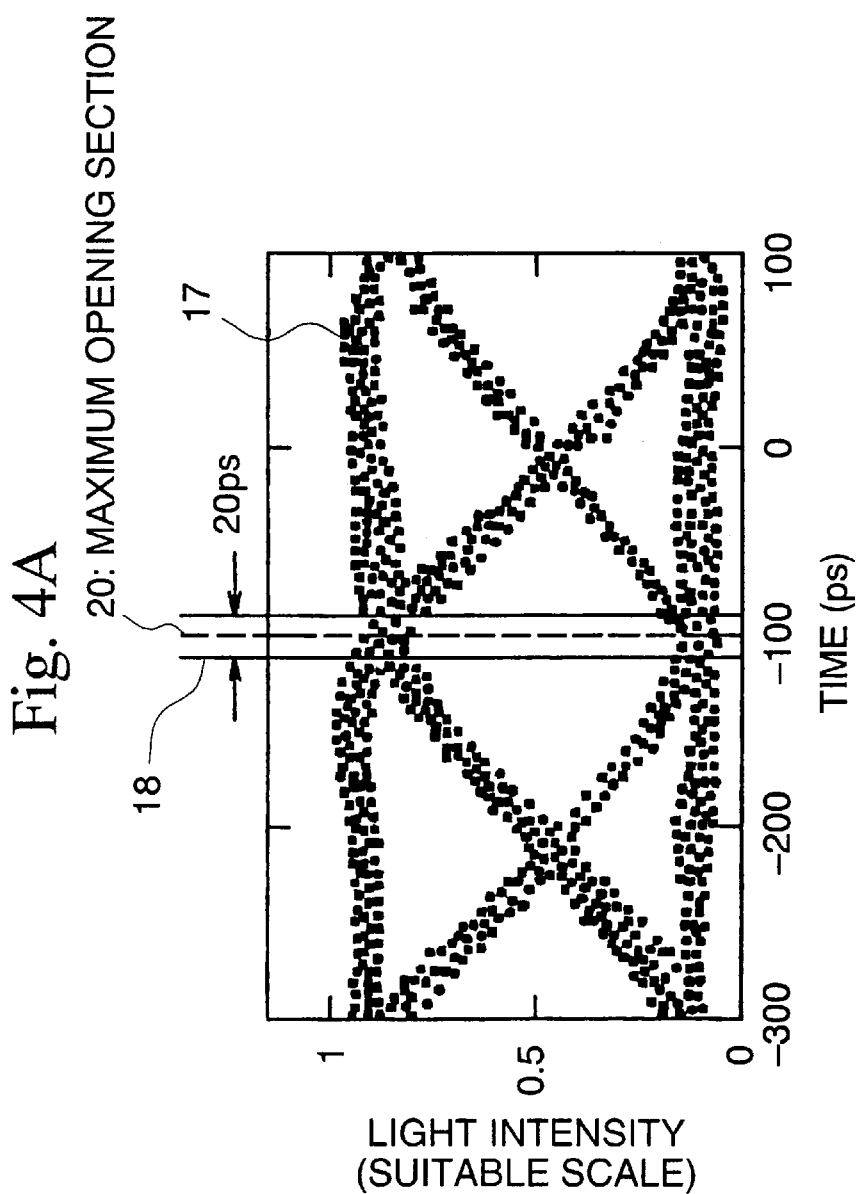
FIGS. 4A and 4B are diagrams of an eye pattern computed in the selection method in the present invention.

FIG. 4A shows eye patterns obtained by simulation and FIG. 4B shows light intensity distribution curves in the eye patterns obtained at light-on and light-off levels, where $\mu_1$, $\mu_0$ refer to average values of the light intensity distribution at light-on and light-off conditions, respectively, and $\sigma_1$, $\sigma_0$ refer to respective standard deviations.

The selection method of the present invention, as shown in FIG. 1, is comprised of the following steps: first, the element to be selected is driven by modulating with random fixed voltage pulses in step S1, and the optical response waveform and the time division chirp characteristics generated in response to the drive signal are measured to obtain light intensity launching signal data 6 ($f_{in}$ (t)) and chirp data 7 ($f_{chirp}$ (t)) shown in FIG. 3. In step S2, after constructing a light launching signal on the basis of light intensity launching signal data 6 ($f_{in}$ (t)) and chirp data 7 ($f_{chirp}$(t)), that have been measured and collected in the first step S1, values of the optical fiber parameters, such as fiber length L, secondary group velocity dispersion β are input into the simulation equations so as to simulate post-transmission waveforms resulting from the launching signal transmitting through the optical fiber path, and based on the results of simulation of post-transmission waveforms of the launching signal, the eye opening penalty $P_{eye}$ is computed as a selection parameter that functions as a index for deciding the dispersion tolerance quality. The details of the process is shown in FIG. 2. Lastly, in step S3, the computed selection parameter is compared with the pre-determined selection criterion to decide for quality of the element so as to select and divide into an acceptable product and a substandard product.

The computational steps of transmission simulation carried out in step S2 are outlined in the flowchart shown in FIG. 2.

First, chirp data 7 ($f_{chirp}$ (t)) are extracted from the measured data shown in FIG. 3, and, after computing the phase $\Phi(t)$ of the electric field component of the sending light according to equation (1) shown below (step S21), using the phase $\Phi(t)$ and launching signal light intensity data 6 ($f_{in}$ (t)) extracted from the measured data shown in FIG. 3, the sending light electric field component $E_{in}$ (t) is computed according to equation (2) shown below (step S22).

$$\Phi(t)=2\pi\int_0^t f_{chirp}(t)dt \qquad (1)$$

$$E_{in}(t)=\{f_{in}(t)\}^{1/2}\cdot\exp\{i\Phi(t)\} \qquad (2)$$

Subsequently, according to equation (3) shown below, Fourier transform is applied to convert the sending light electric field component $E_{in}$ (t) to the frequency space so as to carry out spectrum analysis and compute the sending light electric field component in the frequency space, and the computed sending light electric field component in the frequency space is used as the light launching signal input in the optical fiber path (step S23).

$$\tilde{E}_{in}(\omega)=FFT(E_{in}(t)) \qquad (3)$$

Next, the secondary group velocity dispersion coefficient β of the optical fiber path and the fiber length L are chosen, and the transfer function during the transmission through the optical fiber is computed according to equation (4) shown below, and based on the computed transfer function, the electric field component of the post-transmission optical signal (receiving light) is computed according to equation (5) shown below (step S24).

$$\tilde{H}(\omega) = \exp\left\{-i\frac{\beta\cdot L}{2}(\omega-\omega_c)^2\right\} \qquad (4)$$

where $\omega_c$ is the carrier frequency.

$$\tilde{E}_{out}(\omega)=\tilde{H}(\omega)\cdot\tilde{E}_{in}(\omega) \qquad (5)$$

After performing inverse Fourier transform of the electric field component of the receiving light in the frequency space, computed according to equation (5), to return to the receiving light electric field component $e_{out}$ (t) in the time space according to equation (6) shown below (step S25), receiving light intensity $I_{out}$ (t) is computed according to equation (7) shown below (step S26), and based on the computed receiving light intensity $I_{out}$ (t), the eye patterns 17 shown in FIG. 4A are computed (step S27). Here, the eye patterns 17 are obtained by plotting the receiving light intensity $I_{out}$ (t) for each value of time t. At this time, similar to the steps for computing the receiving light intensity $I_{out}$ (t), the pre-transmission light intensity $I_{in}$ of the light launching signal is also computed from the sending light electric field component $E_{in}$ (t) to obtain eye patterns before the launching signal is transmitted through the optical fiber path (pre-transmission eye patterns may be computed in step S22).

$$e_{out}(t)=IFFT(\tilde{E}_{out}(\omega)) \quad (6)$$

$$I_{out}(t)=|e_{out}(t)|^2 \quad (7)$$

Using the computed eye patterns 17 (for example, 2.5 Gb/s NRZ modulation), and from the data points 18 that are centered about the maximum opening section 20 within a region of 20 ps time-width, the light intensity distribution curve 19a at the light-on level, and the light intensity distribution curve 19b at the light-off level are obtained, which are shown in FIG. 4B. Using the light intensity distribution curves 19a, 19b, the average values $\mu_1$, $\mu_0$, the standard deviation values $\sigma_1$, $\sigma_0$ at light-on and light-off levels, respectively, are computed, and the Q-factor of the receiving light is computed according to equation (8) shown below. At this time, the Q-factor ($Q_{B.B}$) of pre-transmission optical launching signal (launching light) is similarly computed from the pre-transmission eye patterns (step S28).

$$Q=(\mu_1-\mu_0)/(\sigma_1+\sigma_0) \quad (8)$$

The Q-factor is a parameter to show the degree of opening of the eye pattern quantitatively, and changes in the pre- and post-transmission Q-factors are proportional to the power penalty. Therefore, by inputting the value of the computed Q-factor ($Q_{B.B}$) of the sending light and the Q-factor (Q) of the receiving light in the eye opening penalty $P_{eye}$, as defined in equation (9) shown below, the result can be used as a parameter for selecting the transmission capability, i.e., the selection parameter of dispersion tolerance quality of an element. Therefore, a value of the eye opening penalty $P_{eye}$ is computed as the selection parameter from equation (9) in step S29, and a decision of quality for the element is made according to a magnitude of the eye penalty opening (step S3).

$$P_{eye}=10\cdot\log(Q/Q_{B.B}) \quad (9)$$

As explained above, the selection method of the present invention enables to select a light source having a superior dispersion tolerance quality, without actually carrying out measurements (i.e., power penalty) of optical transmission characteristics for each element in each application of the element.

Second Embodiment

This embodiment relates to an example of using the post-transmission Q-factor (i.e., Q-factor of the receiving light, denoted by Q) for the selection parameter. In general, $Q<<Q_{B.B}$, and minute changes $\delta Q$, $\delta Q_{B.B}$ of the Q-factors (Q and $Q_{B.B}$) relative to minute changes $\delta P_{eye}$ in the eye penalty $P_{eye}$ is given by total differential equation (9) as follows:

$$\delta P_{eye}=10\{(1/Q)\delta Q-(1/Q_{B.B})\delta Q_{B.B}\} (1/Q)\delta Q-(1/Q_{B.B})\delta Q_{B.B}\approx(1/Q)\delta Q$$

so that the variation in the selection parameter due to the transmission capability of the element, i.e., the variation in the eye opening penalty $P_{eye}$ may be considered to be governed mainly by the Q-factor of the receiving light. Therefore, instead of using the eye opening penalty $P_{eye}$, selection parameter may be based on a Q-factor itself computed according to equation (8).

Figure 5:
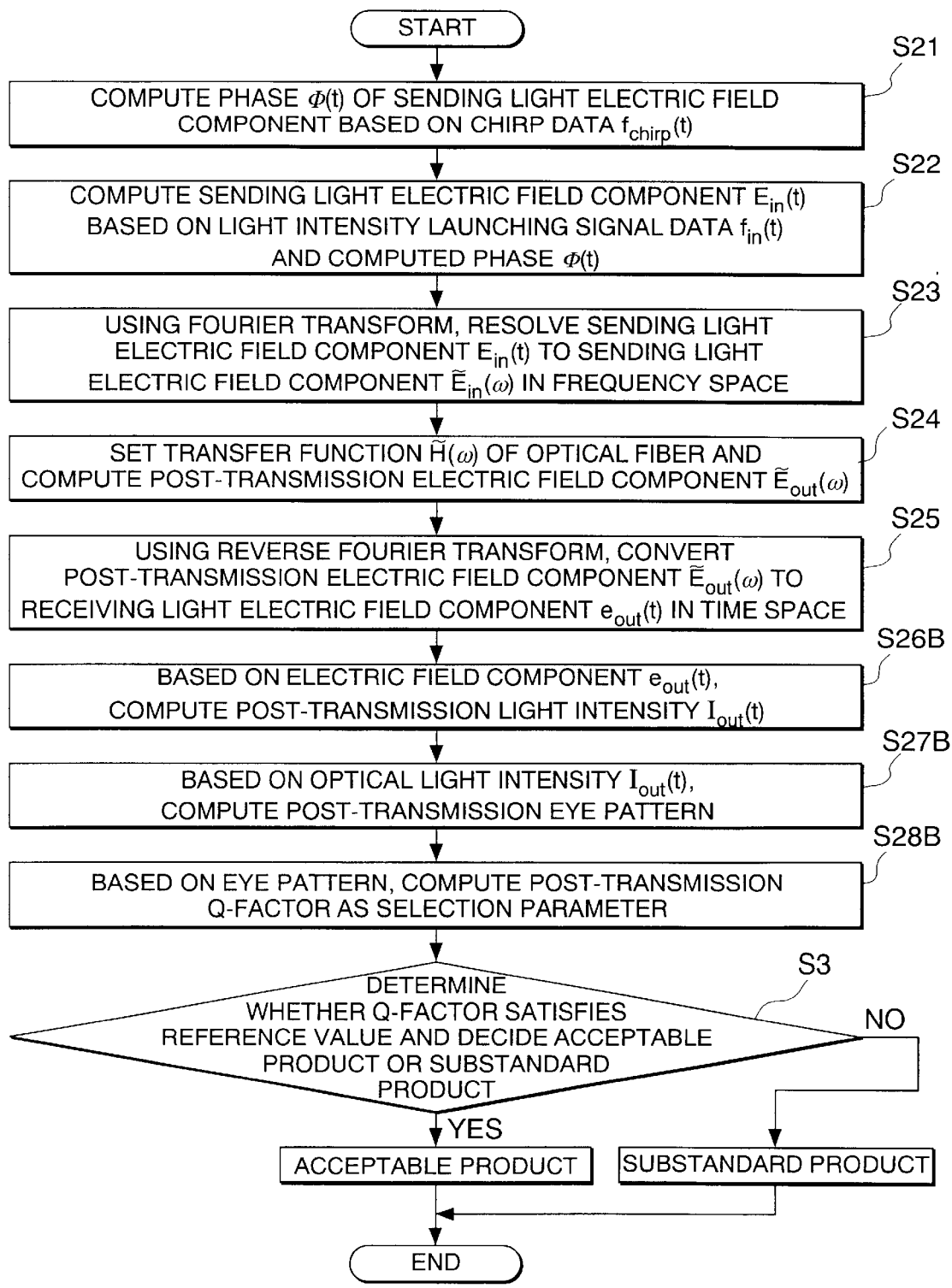
FIG. 5 is a flowchart for the simulation process in a second embodiment according to the present invention.

FIG. 5 shows a flowchart of the process in the second embodiment based on using the Q-factor of the receiving light as the selection parameter. The processing steps to step S25 are the same as those in the first embodiment, but slightly different steps are taken after step S26. In the first embodiment, pre- and post-transmission signal light intensity $I_{in}$ (t), $I_{out}$ (t), eye patterns, Q-factors ($Q_{B.B}$, Q) are computed in steps S26 to S28, and in step S29, the eye opening penalty $P_{eye}$ is computed to be used as the selection parameter, but in the second embodiment, post-transmission signal light intensity $I_{out}$ (t), eye patterns, one Q-factor (Q) are computed in steps S26B to S28B, and pre-transmission parameters are not computed. The eye opening penalty $P_{eye}$ is also not computed. Therefore, the computational process in the second embodiment is simpler than that in the first embodiment, so that an advantage is that the simulation time can be shortened even more.

First, similar to the first embodiment, the electric field component of the receiving light $e_{out}$ (t) is computed according to the procedure described in steps S21 to S25. Next, in step S26B, the post-transmission signal light intensity (receiving light intensity) $I_{out}$ (t) is computed according to equation (7), and the eye patterns shown in FIG. 4A are computed from the receiving light intensity $I_{out}$ (t) in step S27B. Subsequently, in step S28B, based on data points 18 (FIG. 4A) that are centered about the maximum opening section 20 within a region of 20 ps time-width, the light intensity distribution curve 19a at the light-on level, and the light intensity distribution curve 19b at the light-off level are obtained, which are shown in FIG. 4B. Using the light intensity distribution curves 19a, 19b, average values $\mu_1$, $\mu_0$, standard deviation values $\sigma_1$, $\sigma_0$ at light-on and light-off levels, respectively, are computed, and the Q-factor of the receiving light is computed according to equation (8) mentioned earlier. Lastly, the Q-factor computed in step S28 is used as the selection parameter, and in step S3, this Q-factor is compared against a reference value to reach a decision of quality for the element.

FIG. 6 shows the results of comparing actual measured values of power penalty for several elements operated at 2.5 Gb/s modulation rate through a 480 km single mode fiber, and the resulting Q-factors computed according to the simulation method in the second embodiment. When Q>8, the condition of power penalty <3 dB is achieved. Therefore, it is possible to select those elements having less than 3 dB power penalty, by using the Q-factor (Q) obtained by equation (8) as the selection parameter, instead of the eye penalty opening $P_{eye}$, and using Q>8 as the reference value for selection of acceptable or substandard products.

Third Embodiment

FIG. 7 shows a block diagram of a selection device for carrying out the selection method of the present invention. This selection device is comprised by: a data collection section 1 for measuring data such as time division chirp data of an element; and a simulation section 2 that, based on the data obtained by the data collection section 1, computes a post-transmission waveform of an optical signal, computes a selection parameter from a computed optical signal waveform, and compares the selection parameter and a pre-determined selection criterion to reach a decision of quality for the element.

The data collection section 1 is comprised by an element drive section 32 for impressing a high frequency modulation signal on the element 53, and a chirp measure section 33 for measuring the chirp characteristics and output waveform (optical response waveform) of the element 53.

The simulation section 2 is comprised by a simulator 34 and an input/output (i/o) section 35. The i/o section 35, under the control of the simulator 34, inputs and sets the parameters of the optical fiber path in the simulator 34, and displays the results of simulation by the simulator 34. The simulator 34, as shown in FIG. 8, is comprised by: a light launching signal construction section 21 that includes a phase computation section 8 to compute the phase $\Phi(t)$ of the sending light electric field component from the chirp data 7 measured by the data collection section 1, a sending light electric field component computation section 9 to compute the sending light electric field component $E_{in}$ (t) based on the computed phase $\Phi(t)$ and the launching signal light intensity data ($f_{in}$ (t)) extracted from the optical response waveform, and a Fourier conversion section 10 for spectrum analysis of the sending light electric field component $E_{in}$ (t) in the frequency space; a transmission characteristics computation section 22 that includes a transfer function computation section 11 for inputting the secondary group velocity coefficient $\beta$ and the fiber length L to compute a transfer function during transmission through the fiber, and an optical signal waveform computation section 12 for computing post-transmission optical signal waveform through the optical fiber by adding the transfer function to the sending light electric field component in the frequency space; a receiving signal waveform computation section 23 that includes a reverse Fourier transform section 13 for reversing the electric field component of the optical signal waveform in the frequency space computed by the transmission characteristics computation section 22 to an electric field component $e_{out}$ (t) in the time space, and a receiving signal light intensity computation section 14 for computing the receiving signal light intensity $I_{out}$ (t) from the electric field component $e_{out}$ (t); an eye pattern computation section 24 for computing an eye pattern from the receiving signal light intensity $I_{out}$ (t); a Q-factor computation section 25 for computing a Q-factor from the eye pattern; a selection parameter computation section 26 for computing a selection parameter on the basis of the computed Q-factor as an index of dispersion tolerance; a dispersion tolerance evaluation section 27 for reaching a decision of quality for the element on the basis of the selection parameter; and a control section (not shown). Simulation process is carried out under the simulator 34 controlling the operation of the data collection section 1 and the i/o section 35, according to the steps outlined in the flowchart shown in FIG. 2 or FIG. 5.

FIG. 9 shows a schematic diagram of the details of the selection device shown in FIG. 7. The element driving section 32 includes an NRZ signal generator 51 and an electrical amplifier 52 for amplifying the signal from the NRZ signal generator 51 to drive the element 53. The chirp measure section 33 includes a chirp measuring device 55 necessary for determining chirping, and a sampling oscilloscope 54 for determining of a waveform of output light. The simulation section 2 includes a computer 56. The computer 56 includes a computation device and i/o keyboard, printer and display among others.

In the selection device, the element 53 is driven by a fixed voltage pulse train of NRZ signals output from the NRZ signal generator 51 and amplified in the electrical amplifier 52. Modulated output light 50 output from the element 53 is input into the chirp measure device 55, and a portion of the light is diverted inside the chirp measuring device 55 and input into the sampling oscilloscope 54. The sequences of the chirp measuring device 55 and the sampling oscilloscope 54 are controlled by the computer 56, and time division chirp data and the launching signal light intensity data shown in FIG. 3 are measured and extracted from the received modulated output light 50.

The computer 56 not only control sequencing of the chirp measuring device 55 and the sampling oscilloscope 54, but also processes the measured data obtained by the chirp measuring device 55 and the sampling oscilloscope 54 through the simulated transmission process by following the steps indicated in the flowchart in FIG. 2 or 5, and reaches a decision of quality for the target element. Simulation results are output by displaying the results on an associated display device or by printing the results by a printer. When the required dispersion tolerance or transmission conditions are changed, the parameters such as transmission distance (fiber length L), secondary group velocity dispersion $\beta$ of the optical fiber and selection criterion are changed (by inputting from a keyboard the parameters such as transmission conditions and selection criterion, or reading new set of transmission data and selection criterion from the memory), and re-start the simulation process. Accordingly, the method and device of the present invention enable to select a light source that provides superior dispersion tolerance characteristics for optical communication applications, without actually carrying out measurements of optical transmission quality (i.e., power penalty) for each element for each application of the element.

What is claimed is:

1. A method for selecting a light source for optical communication system comprising the steps of:
   measuring time division chirping characteristics and optical response waveforms of the light source responding to a fixed strength random pulse signal;
   performing a simulation of a transmission process based on measured data;
   computing a selection parameter as an index for determining a dispersion tolerance quality of the light source according to a computed post-transmission waveform of an optical signal that propagated through an optical fiber path; and
   deciding the dispersion tolerance quality of the light source based on values of the selection parameter.

2. A method according to claim 1, wherein said selection parameter is a value of an eye opening penalty $P_{eye}$ computed according to an equation:

$$P_{eye}=10 \cdot \log(Q/Q_{B.B})$$

where Q refers to a Q-factor computed from a post-transmission waveform through the optical fiber path resulting from a transmission simulation process, and $Q_{B.B}$ refers to a Q-factor computed from a pre-transmission waveform of said optical signal.

3. A method according to claim 1, wherein said selection parameter is a Q-factor computed from a post-transmission waveform through the optical fiber path resulting from a transmission simulation process.

4. A device for selecting a light source for optical communication system comprising:
   a measuring section for measuring time division chirping characteristics and optical response waveforms of the light source responding to a fixed strength random pulse signal; and
   a simulation section for computing a post-transmission waveform of an optical signal according to measured data, and computing a selection parameter as an index for determining a dispersion tolerance quality of the light source; and determining the dispersion tolerance quality of the light source by comparing the selection parameter with a pre-determined selection criterion.

5. A device according to claim 4, wherein said selection parameter is a value of eye opening penalty $P_{eye}$ computed according to an equation:

$$P_{eye}10 \cdot \log(Q/Q_{B.B})$$

where Q refers to a Q-factor computed from a post-transmission waveform through the optical fiber path computed in the simulation section, and $Q_{B.B}$ refers to a Q-factor computed from a pre-transmission waveform of said optical signal.

6. A device according to claim 4, wherein said selection parameter is a Q-factor computed from a post-transmission waveform through the optical fiber path computed in a simulation section.

* * * * *